(No Model.) 4 Sheets—Sheet 3.
J. B. ALLFREE.
DUST COLLECTING MACHINE.
No. 385,899. Patented July 10, 1888.
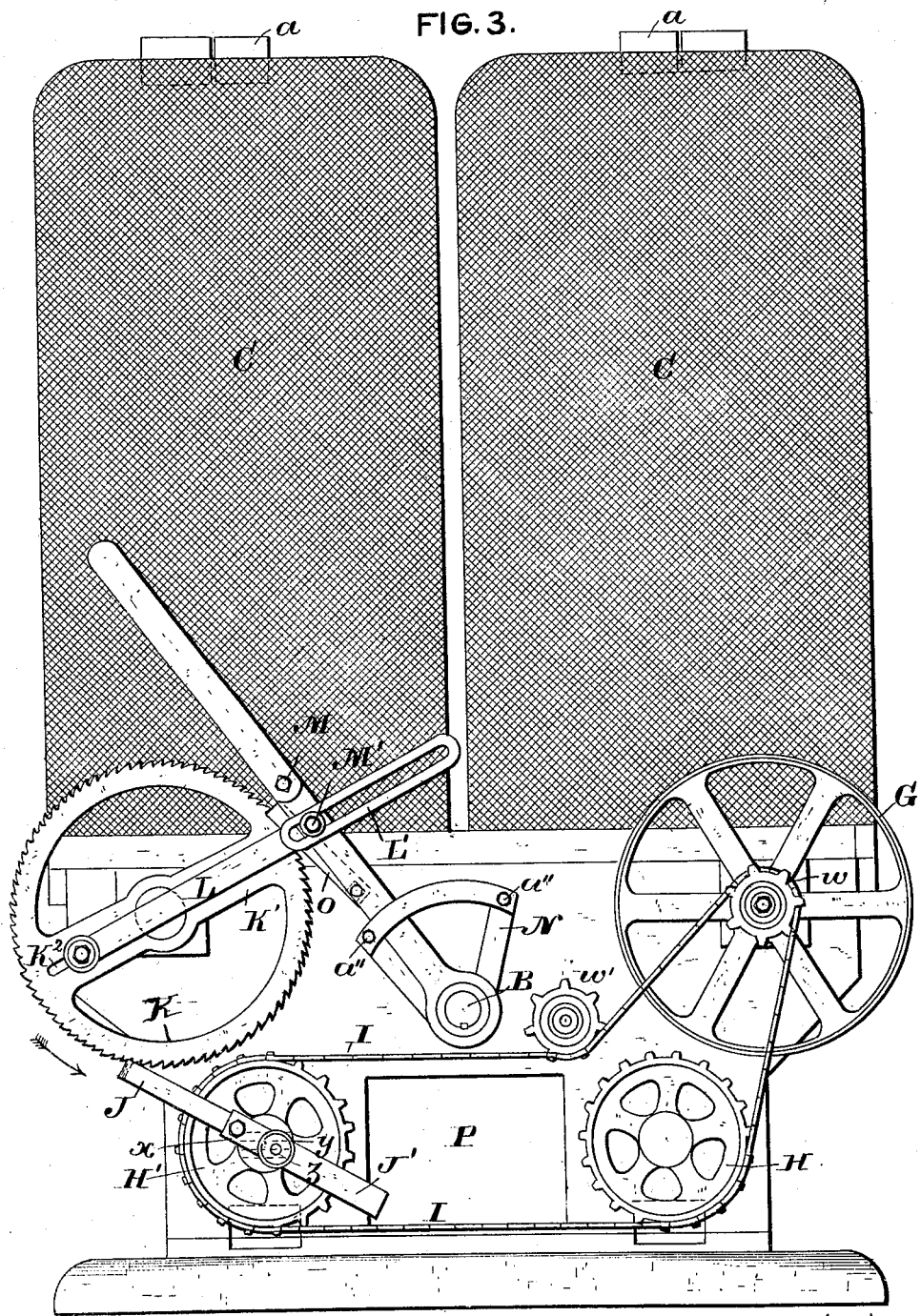
ATTEST.    FIG. 5.      FIG. 6.    INVENTOR.
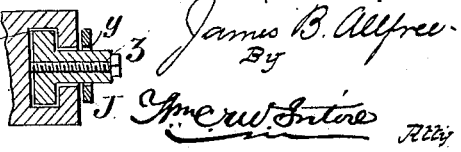

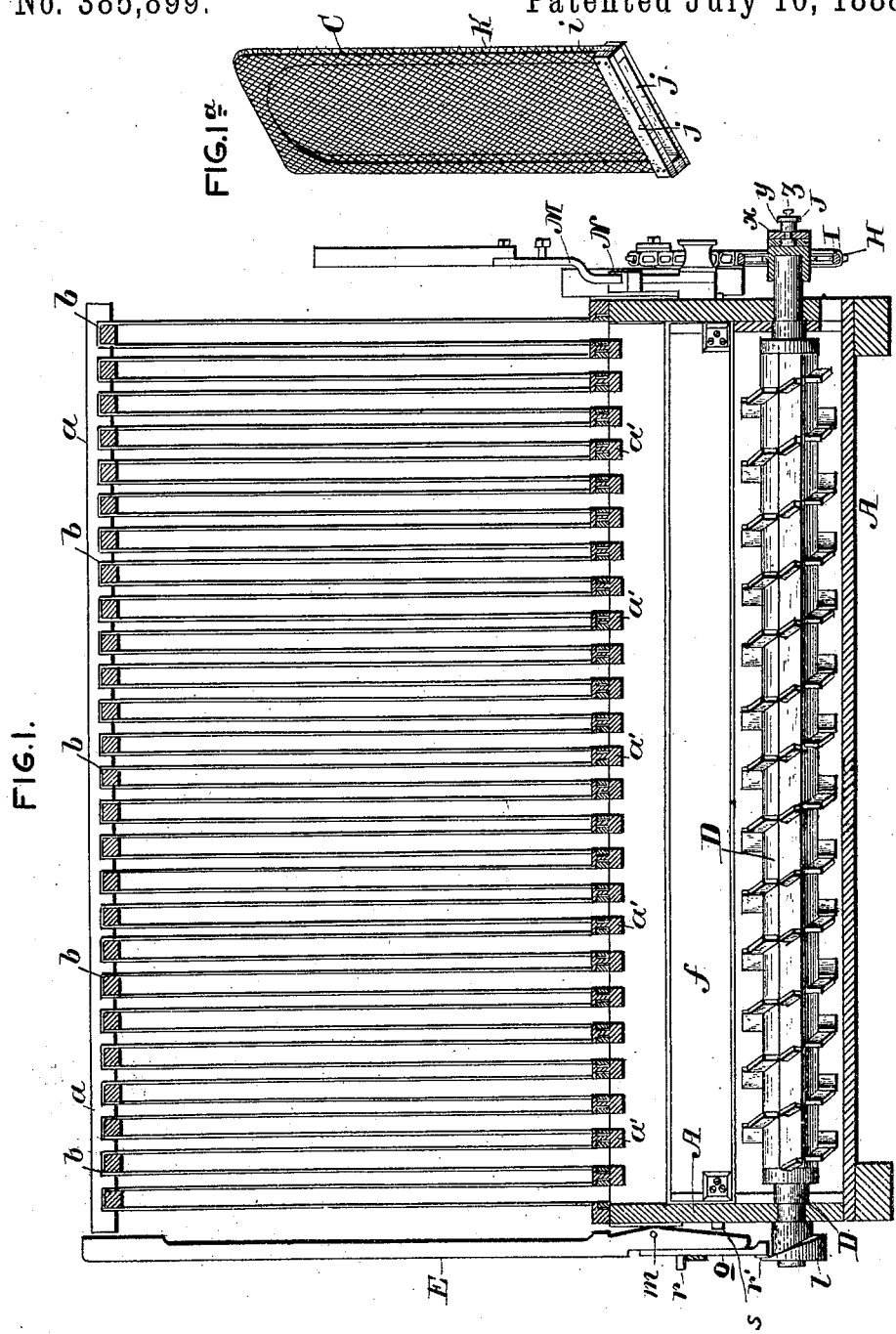

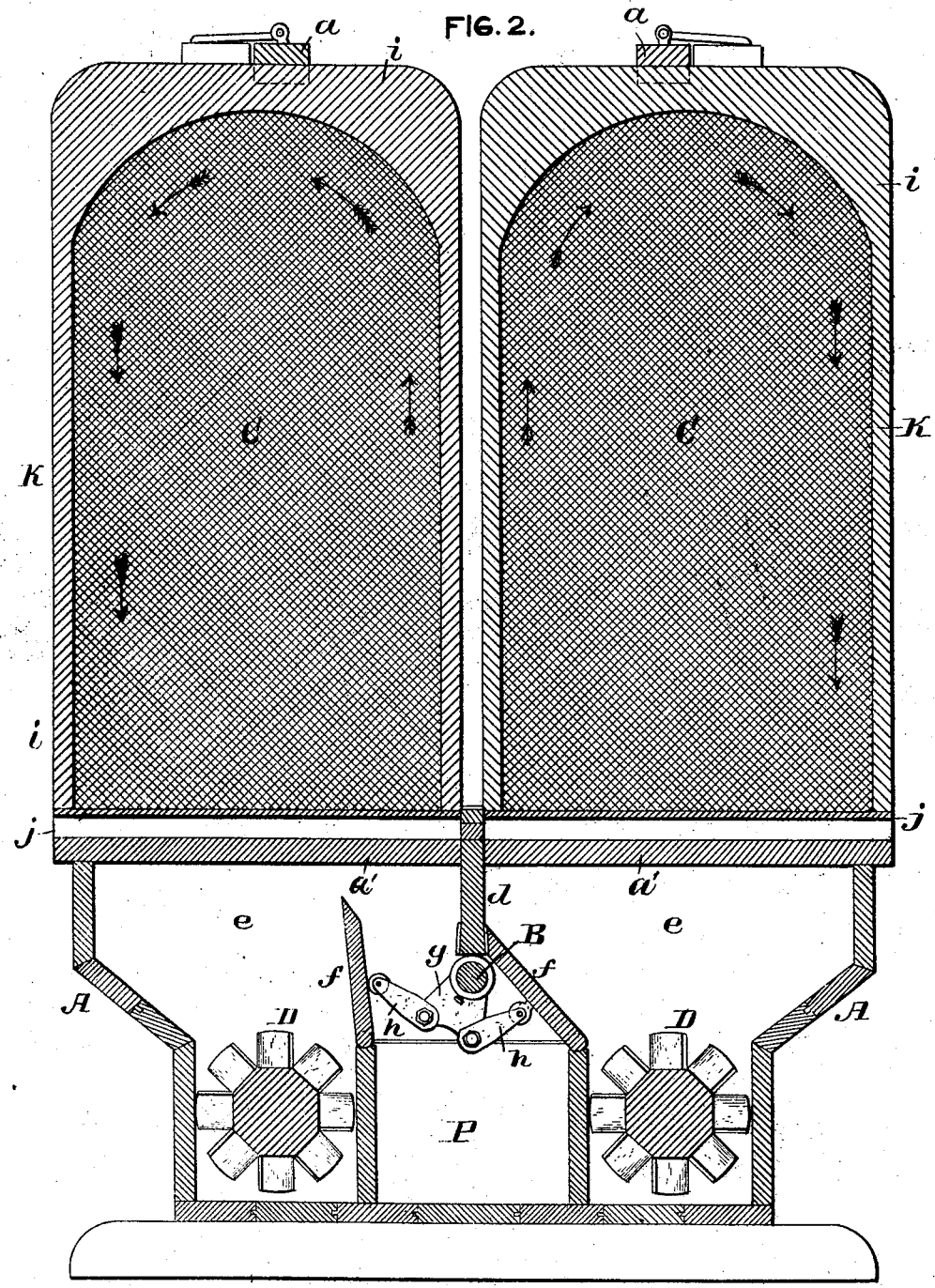

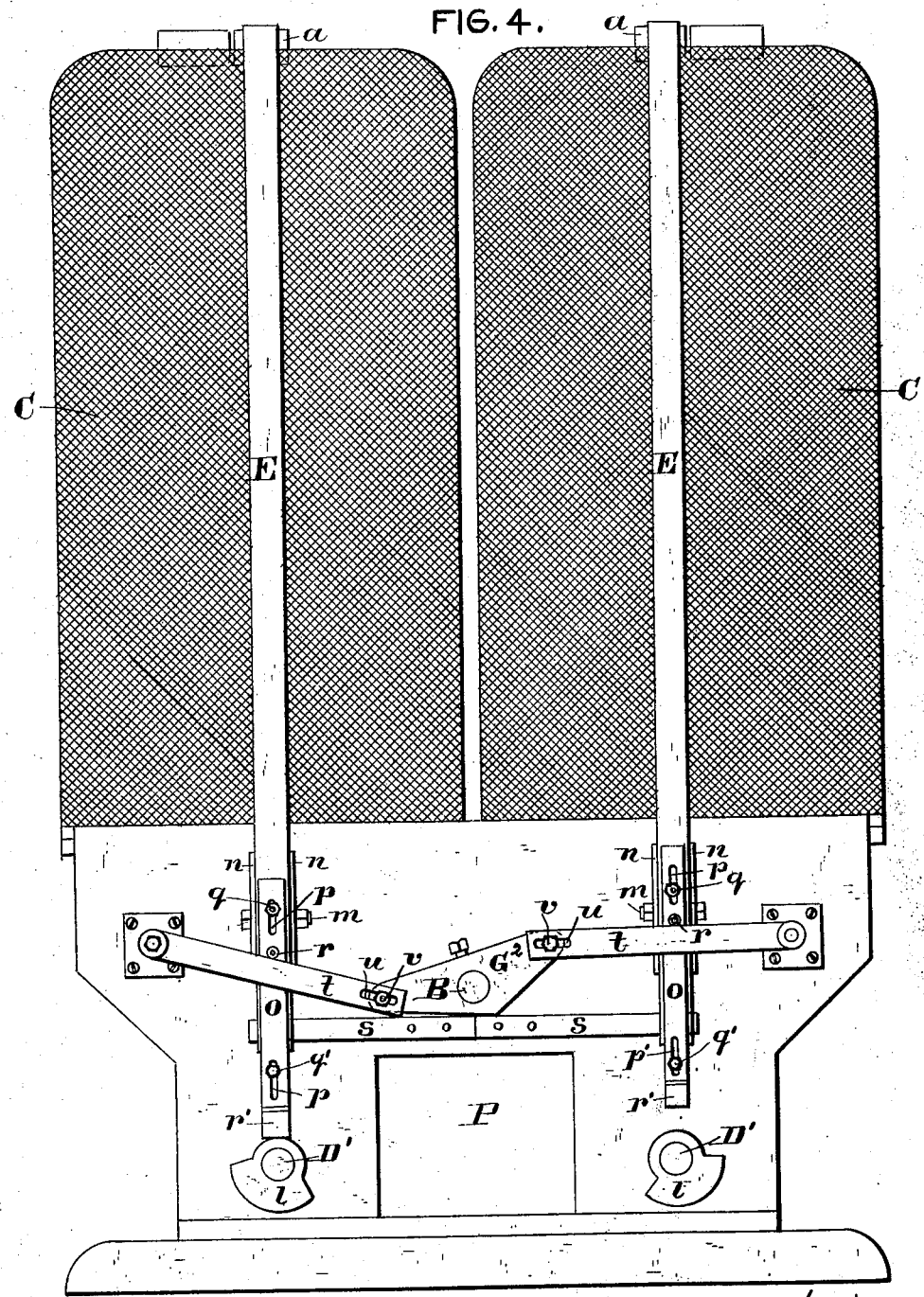

UNITED STATES PATENT OFFICE.

JAMES B. ALLFREE, OF INDIANAPOLIS, INDIANA, ASSIGNOR OF ONE-HALF TO ROBERT SHRIVER AND HARRISON SWARTZWELDER, OF CUMBERLAND, MARYLAND.

DUST-COLLECTING MACHINE.

SPECIFICATION forming part of Letters Patent No. 385,899, dated July 10, 1888.

Application filed September 1, 1887. Serial No. 248,556. (No model.)

*To all whom it may concern:*

Be it known that I, JAMES B. ALLFREE, a citizen of the United States, residing at Indianapolis, Marion county, Indiana, have invented new and useful Improvements in Dust-Collecting Machines, of which the following is a specification.

This invention relates to certain new and useful improvements in machines for collecting dust from the air of factories and mills; and it consists, substantially, in such features of construction and arrangement and combinations of parts as will hereinafter be more particularly described, and pointed out in the claims.

The object of the invention is to provide dust-screens of such character that the dust-laden air forced into them will be deflected around or induced to describe such a course as that a greater amount of stock or material will be saved or prevented from escape through the meshes of the arresting cloths or screens.

Further, the invention has for its object to so construct the cloth screens and their supporting-frames as that the insertion or removal of the former can be quickly effected either for the purposes of cleaning or repair, and without having to stop the machine to effect the same.

Further, the invention has for its object to so arrange the cloth screens with respect to the air-compartments of the machine as that one set or series thereof will act to receive the incoming blasts of air while the other set or series is being operated upon by suitable mechanism to relieve them of the adherence of material or stock, and vice versa.

Further, the invention has for its object to provide simplified and effective automatically-operating mechanism by which the blasts of dust-laden air will be alternately directed into the sets or series of screens through their respective air-compartments; further, to supply mechanism or intermittently-operating devices by which, simultaneously with the cut-off from each series of screens, the said screens will be jarred or vibrated to shake from them any adhering stock, and to practically free or open the meshes by the time the next succeeding charge of air is received.

Finally, the invention has such other objects in view as will more fully hereinafter appear when taken in connection with the accompanying drawings, wherein—

Figure 1 represents a longitudinal sectional elevation of a dust-collecting machine embodying my improvements, and Fig. 1ª is a view in perspective of one of the cloth screens, by which the construction of the same is more clearly indicated. Fig. 2 represents a vertical transverse section of Fig. 1, and Fig. 3 represents an elevation of the machine as viewed from one end. Fig. 4 represents a similar view of the machine, taken from the opposite end. Figs. 5 and 6 are detail views to more clearly indicate the construction of certain parts.

With many former inventions of the present character in the operation of cleaning the filtering-cloth the jarring for the purpose of shaking off the accumulated dust is performed while the blast of air is on. The result of this is that the dust, instead of being released from the cloth, is forced into its meshes, while the cloth, being stretched somewhat by the force of the air-blast, has its meshes more or less expanded, with a tendency to pull the fibers apart and to clog and damage the cloth. I therefore prefer to cleanse the cloth while the air-blast is off, and in order to do so have constructed my machine in two duplicate parts, or, as it were, two machines so constructed that the dust-laden air may be for a time blown into one side to be filtered, while the other side may be relieved of the dust adhering to the walls of the filtering-cloth by a suitable automatic knocker and at suitable intervals automatically changed to the other side, the knocking being also changed at same time, thus alternating the filtering and cleansing operations in the two sides of the machine.

I construct a casing arranged with two conveyers, one at the bottom of either side thereof, allowing an air space or chamber between the two conveyers, and suitable valves located within said casing, so arranged as that the one is open while the other is closed, and the closing of one will open the other, or vice versa, and thus present no obstruction to regular passage of the air from the air-chamber into one side of the casing or the other.

On top of the casing I arrange transversely a series of grooved strips, leaving spaces alternately, forming guides for receiving and supporting two series or sets of upright frames, and over each of these frames a filtering-cloth is slipped. The lower ends of the frames are left open and so constructed as to conveniently slide into the grooved guides, and when all the frames are in place they, with the guides, form a complete top or covering for the casing. In order to steady the top of the cloth sections or frames a notched strip is attached to the top of each series of said frames, the said strips also acting to receive the blow by which the sections are vibrated, in the manner hereinafter explained. When it is desired to remove one of the frames either for cleaning or repair, it is only necessary to release the top from the notched strip and slide the bottom out of the grooved guides in the casing. If the machine is in operation, a block of suitable size may be slid into the grooved guides to close the opening, thus permitting operation of the machine without interruption.

Reference being had to the several parts by the letters marked thereon, A represents the casing having arranged transversely across the top thereof a number of rails, $a'$, grooved or rabbeted in their opposite sides to receive between them the bottom or lower ends of the cloth screens in the manner represented in the drawings. $a\ a$ represent longitudinal strips, one for each series of cloth screens, the said strips being notched to receive the upper portions of the screens and acting to steady the same.

The case A is divided lengthwise by a partition, $d$, into two separate air-compartments, $e\ e$, the said compartments being open at the top and communicating with the interior of the cloth screens at their lower open ends, the admission of dust-laden air to the chambers being controlled by alternately-operating valves $ff$, thus determining to which of the series of screens the air shall be permitted to pass. The valves $ff$ are operated by the rocking of a shaft, B, extending longitudinally of the machine about centrally thereof, and carrying at or near each end a sector, $g$, to which the valves are connected through the medium of links $h\ h$.

Instead of arranging or having the connection between the valves and shaft at or near each end of the machine, I may only employ a single connection about centrally of the machine; but by resorting to such as I have shown and described a more perfect opening and closing of the valves is insured.

C represents the cloth screens employed in the practice of the invention, the same consisting of a frame, $i$, arched at the top, and having the two lower extremities or ends connected or united by strips $j\ j$, which are attached after the enveloping cloth $k$ has been slipped over the frame, thereby serving to hold the said cloth in place. There are two sets or series of these screen-cloths, as is shown, each series communicating with its respective air-compartment.

Located within each compartment $e$ is a conveyer, D, having on one end of its shaft D' a cam, $l$, the said cams having inclined faces, as shown, and being for the purpose of automatically operating the mechanism by which the screen-frames are jarred or vibrated to shake from their cloths adherences of stock arrested from the air in its passage through such cloth. This mechanism is in the shape of a hammer or lever, E, having its fulcrum at $m$ between two guides, $n\ n$, within which works a slide, $o$, the said slide being slotted, as at $p\ p'$, and working on pins $q\ q'$. The slides are each provided with a pin, $r$, and are each formed at their lower ends with a lug or shoulder, $r'$, which abuts against the lower end of the hammers or levers when the said slides are elevated or raised to the extent of their upward movement.

Secured to the end of the case, on the outer side, are springs $s\ s$, which pass in behind the hammers, and the purpose of these springs is to force the lower ends of the hammers outward after being operated upon by the cams $l$, and thus cause their upper ends to tap or knock against the strips $a$, for the purpose of giving to the screen-frames a jar or vibration. I desire to here state that various means could be resorted to for effecting the operation of these hammers, and I do not wish to be understood as limiting myself in this particular construction, such means as I have shown and described, however, being preferably employed in the construction of my dust-collector.

Pivoted to the casing A are two links, $t\ t$, slotted at the ends, as at $u$, and connected by means of pins $v$ to the ends of arms $G^2$, keyed on the shaft B at the same end of the machine at which the hammers are located. These links $t\ t$ come beneath and are in contact with the pins $r$ of the slides, and it will appear that the rocking of shaft B will, from the described connections, act to alternately raise and lower the links and consequently cause the slides to move up and down with them. The slides are at the limit of their upward movement at the time their corresponding valve is opened, and in the operation of the machine they are alternately operated upon by the cam $l$, as hereinbefore explained.

The advantage gained by the arch form of the cloth frames is that the air as it strikes the arch will be deflected around in such manner as to cause a centrifugal or whirling action, and the particles of stock or material with which it is laden will be arrested and the heavier portions thereof fall beneath to the conveyers, such of the lighter particles as may adhere to the cloths being shaken off by the jarring of the frame. I have found in practice that a current is established in the direction indicated by the arrows, giving superior results, and which I have been unable to obtain by any of the ordinary or well-known styles of screen-frames at present in use.

G represents a wheel or pulley by which the machine is driven from any suitable power, the hub of the said wheel being formed or provided with sprockets $w$ and supported upon a small journal projecting from a plate secured to the machine, as shown.

H represents a sprocket-wheel keyed or secured to one of the conveyer-shafts, and H' a similar wheel attached in like manner to the opposite conveyer-shaft. A sprocket-belt, I, passes around these sprocket wheels, as well as around the sprockets $w$ and a small idler, $w'$, and it is evident that motion imparted to the wheel or pulley G will be communicated to the conveyer-shafts, and thereby operate the conveyers to carry off the material delivered thereto.

The wheel H' has formed in the outer face of its hub a slot or groove, $x$, in which is held a pin, $y$, having a screw, $z$, passing therethrough and serving to tighten it in the slot. The pin $y$ has loosely supported thereon a pallet, J, having its lower end weighted, as at J', so as to maintain the same always in the position indicated when the machine is in operation, or, rather, to maintain it in such position as to engage the teeth of the ratchet-wheel K, which it is designed to operate.

The ratchet-wheel K is supported at the end of the machine in like manner as the wheel or pulley G, and it is through the engagement of the pallet J with this ratchet-wheel that motion is communicated to the devices which operate the shaft B and valves $ff$. The said wheel K is formed or provided with a single transverse rib, K', having therein a slot, $K^2$, and it is through this slot that attachment to the wheel is made of a connecting-rod, L, that is designed to have axial movement, so that as the wheel is rotated in the direction of the arrow the said arm will be alternately operated, in the manner hereinafter explained. This connecting rod L is formed with a slot, L', through which movable connection is made with a lever, M, by means of a screw-pin, M', as shown.

The lever M is journaled to the hub of a sector, N, that is keyed upon the shaft B, the said sector being in duplicate and united by pins or bolts $a''$, and the said lever works centrally of the sector between the pins, as shown. The lever M is weighted at its outer end, and, being movable upon the hub of the sector, it will be seen that as it is brought to a vertical position by being moved back and forth in the arc of a circle it will fall from side to side as its center of gravity is passed, and, being thus brought into contact with the pins $a''$ alternately, one of the valves $ff$ will be closed and the other opened simultaneously therewith.

The pallet J is loose upon its pin, and the said pin is brought to such eccentricity with the axis of the sprocket-wheel H' as will cause the said pallet to take up more or less of the teeth of wheel K, and thereby act to rotate this wheel during the operation of the machine. The pallet, being weighted at its lower end, will be forced into engagement with the teeth of the ratchet-wheel in an obvious manner. The slot $K^2$ in the wheel K permits of changing the eccentricity of the connecting-rod L, so as to give greater or less motion to the lever M.

O represents a pawl pivoted to the end of the case on the outer side, and acts in its engagement with the ratchets of wheel K to prevent any retrograde or back movement of said wheel.

The operation of my dust-collecting machine is as follows: The dust-laden air is blown or otherwise forced into the passage P between the two air-compartments $ee$, and we will suppose that at the time of starting the machine the valves $ff$ are in the position indicated in Fig. 2, and the mechanism at each end of the machine will then be in the positions represented by Figs. 3 and 4. Now, as the machine is operated the revolutions of the sprocket-wheel H' will impart an eccentric movement to the pallet J and cause the same to take up a greater or less number of the teeth of wheel K, according to the degree of eccentricity at which pin $v$ has been set, and in this way the ratchet-wheel will be moved intermittently in the direction of the arrow, the pawl O acting to prevent any back movement of the ratchet-wheel. This described movement of the wheel K will cause the connecting-rod L to impart motion to the lever M, carrying it past its center, whereupon the said lever will fall against the pin $a''$ at the right-hand side of the machine, and thus by its weight suddenly reverse the position of the valves by opening the one and closing the other. At this time the pin M' of the lever M will be at the outer extremity of the slot in the connecting-rod, and the continued movement of wheel K will cause a reverse action, in that the slot will move upon the pin until the lever M has been again lifted back to a vertical line, when it falls and assumes its original position at the time of starting, this alternate action continuing as long as the machine is operated, the incoming blasts of dust-laden air being alternately directed into the opposite series of cloth screens. The cams $l$ are so arranged upon the conveyer-shafts D' as that at the time the alternate opening and closing of the valves are effected the slides $o$ will be correspondingly raised and lowered, by which, as soon as the valve of a series of screens is closed, the hammer corresponding with this series will be operated to tap or knock against the strip $a$, and thus jar the screen-frames to shake from their enveloping cloths the adherence of stock.

From the foregoing description it is thought the construction and operation of my dust-collecting machine will be clear to those skilled in the art to which it appertains, and while I have herein shown and described certain devices or mechanism for accomplishing the objects sought, I do not wish to be limited thereto in precise detail, since various changes could be resorted to and still be within the scope of my invention.

Having thus described my invention, what I claim as new, and desire to secure by Letters Patent, is—

1. In a dust-collecting machine, the combination of two air-compartments, a series of screens for each, a lever or hammer pivotally supported at one end of each series of screens, slides working on the hammers, vibrating links alternately raising the slides, and cams operating upon the same, whereby the hammers are operated to alternately tap against their respective series of screen-frames, substantially as described.

2. In a dust-collecting machine, the combination, with the casing, of a series of transverse strips arranged across the top, grooved in their sides and having spaces between them, of the screens fitting said spaces between the strips, and the longitudinal notched strips resting upon and secured to the screens at the top, substantially as described.

3. In a dust-collecting machine, a screen constituted of a frame arched at the top and having a cloth envelope, the said cloth being secured in place by means of strips connecting the lower ends of the frame, substantially as described.

4. In a dust-collecting machine, the combination of the casing, the central longitudinal shaft having sector N, the lever working in said sector, the ratchet-wheel supported at the end of the casing, the connecting-rod L, having a slot in its end and forming a movable connection with the lever, and means for rotating the wheel, substantially as described.

5. In a dust-collecting machine, the combination, with conveyer shafts and the ratchet-wheel, of the sprocket-wheel H', carried by one of the conveyer-shafts, the pallet carried by said wheel eccentric to its axis and adjustable thereon, and means for rotating said wheel, substantially as described.

6. In a dust-collecting machine, the combination, with the ratchet-wheel, of the sprocket-wheel H', having a transverse slot in its hub, a pin fitting said slot having a set-screw, a pallet loosely supported by the pin eccentric to the axis of the sprocket-wheel, and means for operating the latter, substantially as described.

7. In a dust-collecting machine, the hammers or levers having their fulcra at one end of the machine, a vertically-moving slide for each hammer, means for simultaneously and oppositely operating said slides, and cams on the conveyer-shafts for rocking the levers on their fulcra, substantially as described.

8. In a dust-collecting machine, the hammers or levers having their fulcra at one end of the machine, a vertically-moving slide for each hammer, means for simultaneously and oppositely operating said slides, cams on the conveyer-shafts for rocking the levers on their fulcra, and springs tending to force the upper ends of said levers inwardly, substantially as described.

9. In a dust-collecting machine, the combination, with the shaft B, sector N, and lever M, of the ratchet-wheel having a slot, the arm L, slotted to form a movable connection with the lever and having its pivot in the slot of the wheel, and means for operating said wheel, substantially as described.

10. In a dust-collecting machine, the combination, with the two air-compartments, a separate valve and series of cloth screens for each compartment, the rock-shaft B, connected to the valves and bearing the sector N, the lever M, working in the sector, the arm L, the ratchet-wheel and means for operating the latter, substantially as described.

11. In a dust-collecting machine, the combination, with the hammers or levers, and the shaft B, bearing the arm $G^2$, of the slides $o\ o$, slotted and working on pins, the links $t\ t$, movably connected to the arms $G^2$ and engaging pins on the slides, the cams $l$ on the conveyer-shafts, and means for rocking the shaft B, substantially as described.

In witness whereof I have hereunto set my hand in the presence of two subscribing witnesses.

JAMES B. ALLFREE.

Witnesses:
E. EVERETT ELLIS,
M. P. CALLAN.